(12) United States Patent
Suzuki

(10) Patent No.: US 7,170,523 B2
(45) Date of Patent: Jan. 30, 2007

(54) DRAWING-INFORMATION PROCESSING APPARATUS AND DRAWING-INFORMATION PROCESSED METHOD

(75) Inventor: Naoki Suzuki, Nagaoka (JP)

(73) Assignee: Fujitsu Limited, Kawasaki (JP)

( * ) Notice: Subject to any disclaimer, the term of this patent is extended or adjusted under 35 U.S.C. 154(b) by 169 days.

(21) Appl. No.: 09/790,696

(22) Filed: Feb. 23, 2001

(65) Prior Publication Data
US 2002/0021301 A1 Feb. 21, 2002

(30) Foreign Application Priority Data
Aug. 14, 2000 (JP) .............................. 2000-246006

(51) Int. Cl.
*G09G 5/00* (2006.01)
*G06T 11/20* (2006.01)

(52) U.S. Cl. ...................................... 345/581; 345/442

(58) Field of Classification Search ................ 345/581, 345/179, 441, 592
See application file for complete search history.

(56) References Cited

U.S. PATENT DOCUMENTS

| 4,831,568 | A | * | 5/1989 | Ito | 708/141 |
| 5,239,292 | A | * | 8/1993 | Willan | 345/441 |
| 5,311,207 | A | * | 5/1994 | Kusumoto et al. | 345/601 |
| 5,347,620 | A | * | 9/1994 | Zimmer | 345/592 |
| 5,500,925 | A | * | 3/1996 | Tolson | 345/581 |
| 5,847,712 | A | * | 12/1998 | Salesin et al. | 345/582 |
| 6,011,536 | A | * | 1/2000 | Hertzmann et al. | 345/418 |
| 6,195,100 | B1 | * | 2/2001 | Tibbett | 345/581 |
| 6,348,924 | B1 | * | 2/2002 | Brinsmead | 345/441 |
| 6,404,419 | B1 | * | 6/2002 | Nagashima | 345/173 |

* cited by examiner

*Primary Examiner*—Ryan Yang
(74) *Attorney, Agent, or Firm*—Staas & Halsey LLP

(57) ABSTRACT

A drawing-information processing apparatus is used for setting drawing information at positions specified through a drawing-information inputting part. An attribute-inputting part is used for setting attribute of the drawing information, and a changing part is used for changing an attribute of the drawing information while the drawing information is input through the drawing-information inputting part.

16 Claims, 18 Drawing Sheets

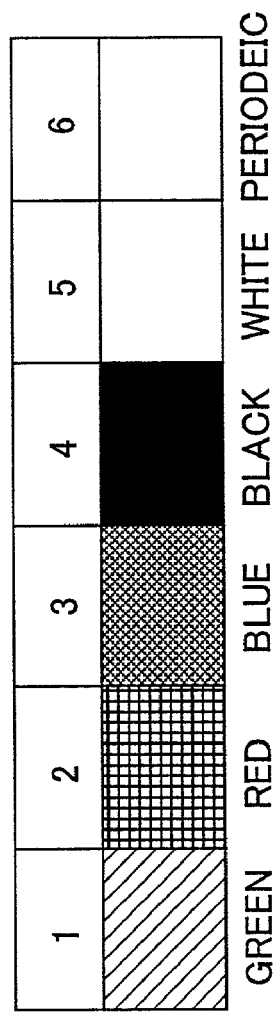

DRAWING-INFORMATION PROCESSING APPARATUS AND DRAWING-INFORMATION PROCESSED METHOD

BACKGROUND OF THE INVENTION

1. Field of the Invention

The present invention relates to a drawing-information processing apparatus and a drawing-information processing method, and, in particular, to a drawing-information processing apparatus and a drawing-information processing method by which line drawings and so forth can be drawn in longhand.

2. Description of the Related Art

Conventionally, as applications for a computer, there are drawing programs for inputting line drawings by using input devices such as a mouse, a stylus pen of a digitizer, and so forth.

When a line drawing is input by using a mouse through such a drawing program, as a result of the mouse being moved with it being dragged, a line segment corresponding to a thus-obtained movement track of the mouse is drawn.

By using such a sort of drawing program, it is possible to change attributes of a line such as a thickness, a color, a shape, and so forth. In the related art, operation of changing these attributes is performed after the inputting operation through the inputting device is interrupted. For example, when the inputting device is a mouse, a state of dragging of the mouse is canceled, and, by clicking a desired attribute button from among previously set buttons for changing the attributes displayed on a display screen, it is possible to change the attribute of drawing. When the inputting device is a stylus pen, a contact (tap) between the stylus pen and a pad is cancelled, and, then, by tapping a desired attribute button from among previously set buttons for changing the attributes on a display screen, it is possible to change the attribute of drawing. Then, the inputting operation is again started from the point at which it is interrupted as mentioned above.

As described above, when an attribute of drawing is changed while drawing information is input by using a mouse or a stylus pen which is an inputting device, it is necessary to once interrupt the input of the drawing information, and, then, perform operation of changing the attribute. When inputting of drawing information is restarted after being interrupted once as mentioned above, it is necessary to make a position of the pointer coincident with the position at which the inputting of the drawing information was interrupted. Accordingly, a time is required for restarting inputting of drawing information from that position, and, thereby, the efficiency of drawing-information processing is degraded. Further, it may not be possible to restart at the precise position, and, thereby, the functionality of drawing-information processing is degraded.

SUMMARY OF THE INVENTION

An object of the present invention is to solve the above-mentioned problems, and, to provide a drawing-information processing apparatus and a drawing-information processing method by which it is possible to process drawing-information input through an inputting device efficiently and functionally.

The present invention includes changing of an attribute of drawing information while the drawing information is input through a drawing-information inputting device.

Specifically, by pressing keys of a keyboard to which respective attributes of drawing information are previously assigned, while inputting the drawing information through a mouse or a stylus pen, it is possible to render continuous inputting of drawing information with different attributes, a change therebetween being made during the continuous inputting of drawing information.

The above-mentioned changing of the attribute of drawing information may include at least one of changing of a thickness attribute of the drawing information, changing of a color attribute of the drawing information and changing of a line attribute of the drawing information. Thereby, it is possible to set attributes in various patterns, and to render functionally and efficiently drawing processing.

The above-mentioned changing of the attribute of drawing information may include changing the attribute of the drawing information gradually. Thereby, it is possible to render functional drawing processing.

The above-mentioned changing of the attribute of drawing information may include changing the attribute of the drawing information periodically. Thereby, it is possible to render functional drawing processing.

According to the present invention, it is possible to change an attribute of the drawing information while the drawing information is input, without interrupting the input of drawing information. Thereby, it is possible to render functionally, efficiently drawing-information processing.

Other objects and further features of the present invention will become more apparent from the following detailed description when read in conjunction with the accompanying drawings.

BRIEF DESCRIPTION OF THE DRAWINGS

FIG. 5 shows one example of a thickness attribute made to correspond to keys of a keyboard according to the present invention;

FIG. 6 shows one example of a color attribute made to correspond to keys of the keyboard according to the present invention;

FIG. 7 shows one example of a line attribute made to correspond to keys of the keyboard according to the present invention;

DETAILED DESCRIPTION OF THE PREFERRED EMBODIMENT

Figure 1:
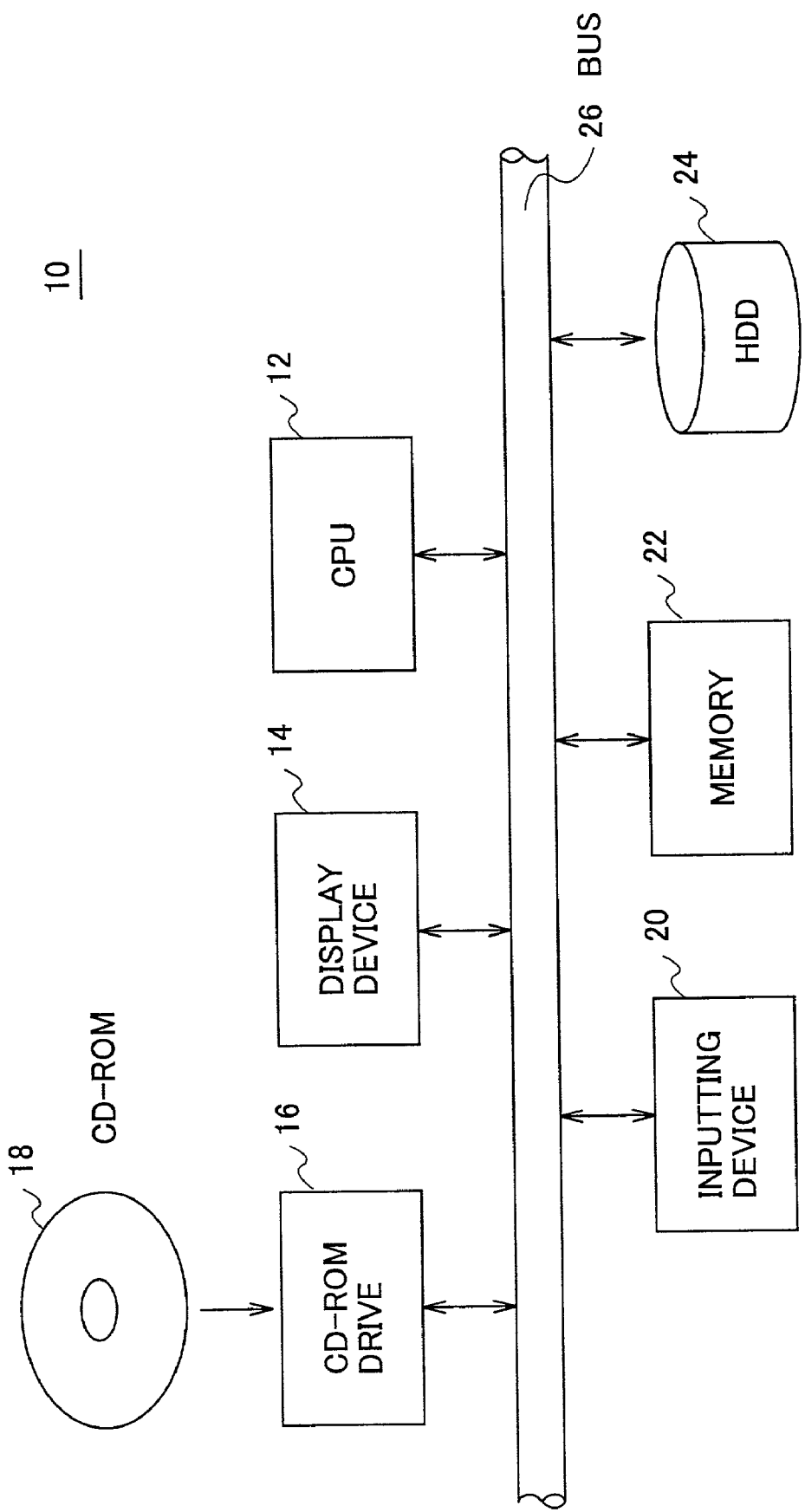
FIG. 1 is a block diagram showing one embodiment of the present invention.

FIG. 1 is a block diagram showing one embodiment of the present invention. In the figure, a drawing-information processing apparatus 10 in the embodiment of the present invention includes a CPU 12, a display device 14, a CD-ROM drive 16, an inputting device 20, a memory 22 and an HDD (Hard Disk Drive) 24, which are connected via a bus 26.

The CPU 12 performs operation based on a drawing-processing program installed in the HDD 24. In the HDD 24, the drawing-processing program and drawing information are stored.

The display device 14 includes a display unit such as a CRT, LCD or the like, reads drawing information having undergone drawing-information processing from the memory 22, and displays it on a screen of the display unit.

The CD-ROM drive 16 reads data or a program previously recorded in a CD-ROM 18. Specifically, for exmaple, the drawing-processing program according to the present invention is previously recorded in the CD-ROM 18, is read therefrom, is then written to the HDD 24, is read therefrom by the CPU 12, which then performs drawing-information processing according to the present invention which will now be described in detail.

The inputting device 20 includes a keyboard, a mouse, a stylus pen, and/or the like, and is used by an operator/user for inputting data or commands to the drawing-information processing apparatus. The memory 22 includes RAM/ROM and/or the like, and is used as a work area of the CPU 12, for example.

The drawing-information processing according to the present invention performed by the drawing-information processing apparatus shown in FIG. 1 will now be described.

Figure 2:
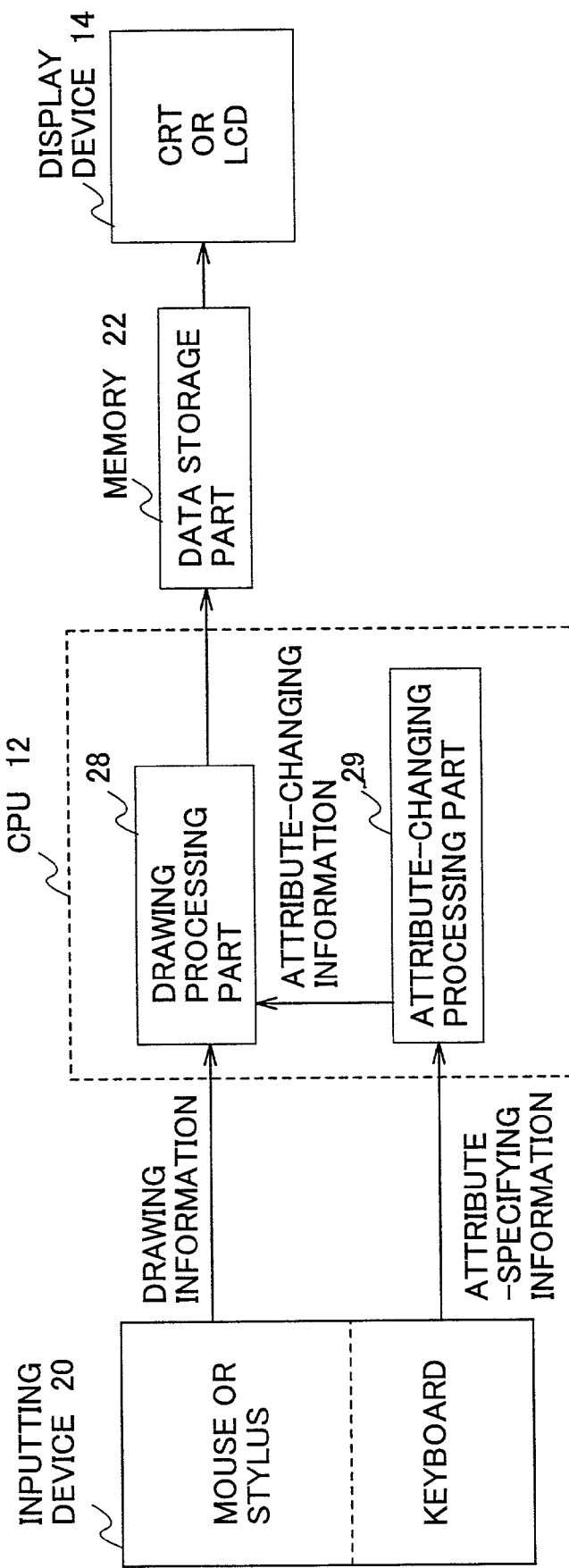
FIG. 2 is a functional block diagram showing a drawing-information processing apparatus shown in FIG. 1.

As shown in FIG. 2, the inputting device 20 of the drawing-information processing apparatus 10 is used for inputting to the CPU 12 drawing information such as that of line drawings, through the mouse, stylus pen, or the like by an operator. Based on the input drawing information, a drawing-processing part 28 of the CPU 12 performs the drawing-information processing.

Further, the inputting device 20 is used for specifying to the CPU 12 an attribute of the drawing information as a result of the operator pressing a predetermined key of the keyboard. Based on the thus-input attribute-specifying information, an attribute-changing part 29 of the CPU 12 performs processing of attribute changing. The result of the processing is provided to the drawing-processing part 28 as attribute-changing information. The drawing-processing part 28, when having the attribute-changing information provided thereto, changes the attribute of the original drawing information, and performs the drawing processing based on the thus-obtained (after being changed) drawing information.

For example, when drawing information of a line is input through the mouse, a key of the keyboard is pressed for specifying of a thickness of the line while the inputting is performed through the mouse by the operator, and, thereby, the thickness of the line displayed on the display unit is changed.

A result of such processing performed by the drawing-processing part 28 is stored in a data storage part of the memory 22. The data thus stored in the memory is provided to the display device 14, and is output to the display unit (CRT, LCD or the like). Thus, the data is displayed on the display unit of the display device 14.

Figure 3:
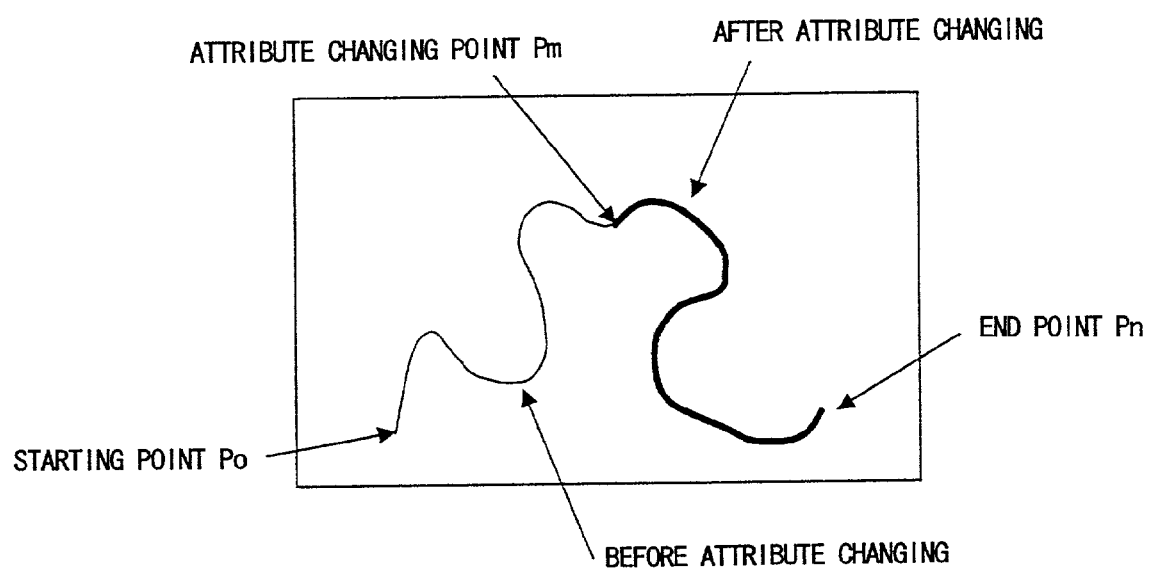
FIG. 3 illustrates display of drawing information having undergone drawing-information processing according to the present invention.

FIG. 3 illustrates a display state of drawing information having undergone the drawing processing. FIG. 3 shows the display state in that the stylus pen of the digitizer is used and a line is input, and, in the middle of inputting the line, an attribute (thickness of the line) is changed (increased).

Specifically, the line is input from a starting point P0 at which the stylus pen of the digitizer comes into contact with the pad of the digitizer first, thus-input drawing information undergoes the drawing processing, and, then, is displayed on the display unit. The line is displayed with a previously set attribute (thickness) from the starting point P0, and the attribute is changed (the thickness is increased) at an attribute changing point Pm as a result of a predetermined key of the keyboard being pressed. At this time, the inputting through the stylus pen is continued by the operator, and, at the attribute changing point Pm, the attribute corresponding to the key, that is, the thickness of the line is increased (thickened) and the thick line is displayed from the attribute changing point Pm, as shown in FIG. 3. The line, the thickness of which is thus changed, is displayed up to an end point Pn at which the stylus pen is first separated from the pad.

Figure 4:
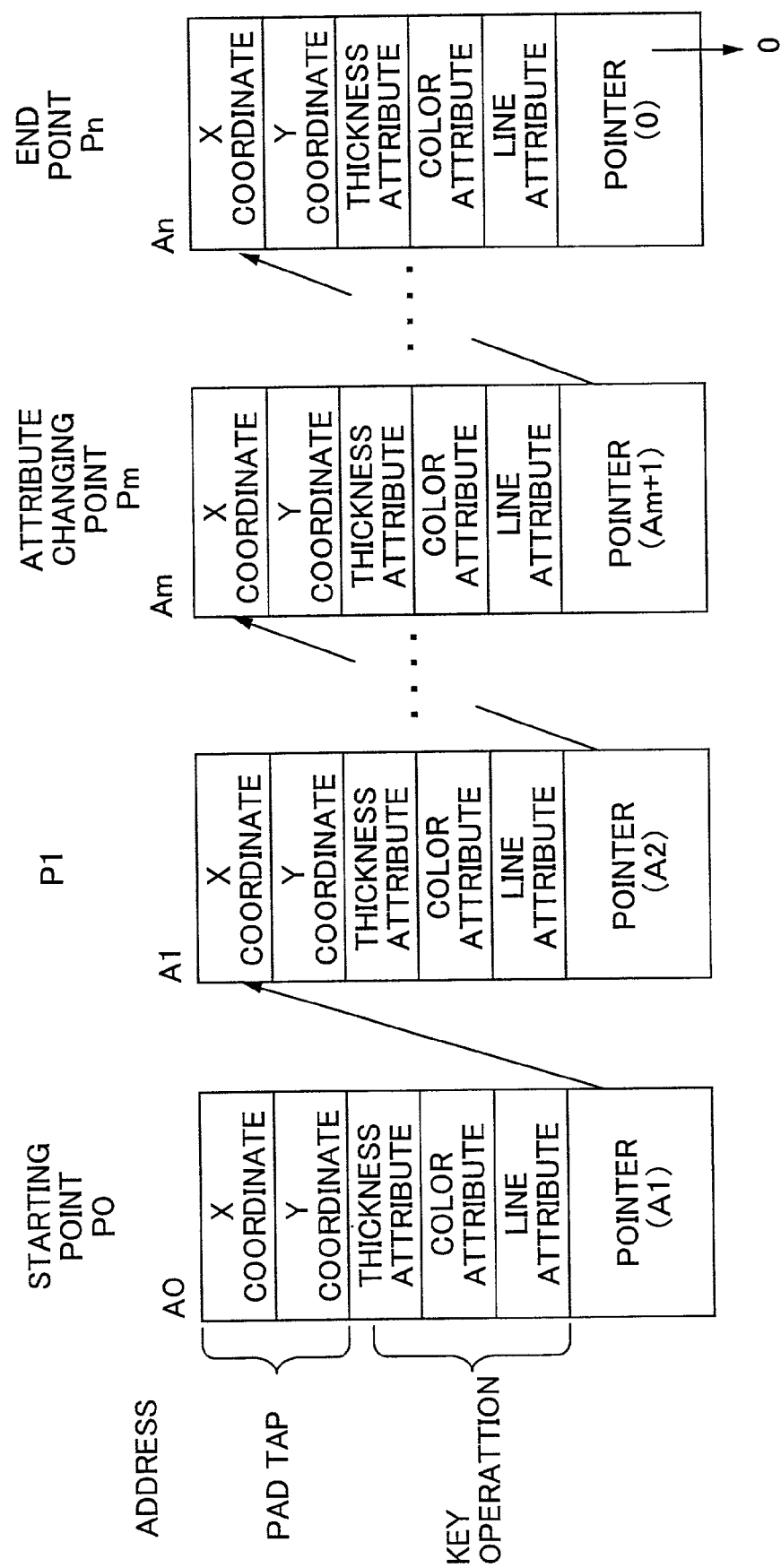
FIG. 4 shows a data structure of drawing information rendering the display shown in FIG. 3.

FIG. 4 shows a data structure of the drawing information illustrated in FIG. 3. As shown in FIG. 4, the drawing information of sampling points from the point at which the stylus pen and pad of the digitizer come into contact with one another first, to the point at which they are separated from one another first is stored in the memory.

First, drawing information of the starting point P0 is stored in a memory area of an address A0. The drawing information stored includes, as shown in FIG. 4, an X coordinate and a Y coordinate of the point at which the stylus pen is in contact with (taps) the pad of the digitizer, a thickness attribute, a color attribute and a line attribute set through predetermined key operations, and a pointer. The pointer of the drawing information of the starting point P0 is an address A1, and specifies the address A1 of subsequent drawing information.

The drawing information of a point P1 at which the stylus pen taps with the pad subsequently to the point P0 is stored in the memory area of the address A1 similarly to the starting point P0. The drawing information stored in this memory area also includes an X coordinate and a Y coordinate of the point at which the stylus pen taps the pad of the digitizer, a thickness attribute, a color attribute and a line attribute, and a pointer A2. The pointer of the drawing information of the starting point P1 is directed to an address A2, and specifies the address A2 of subsequent drawing information.

The drawing information of a point Pn is stored in the memory area of an address An. The drawing information stored in this memory area also includes an X coordinate and a Y coordinate of the point at which the stylus pen taps the pad of the digitizer, a thickness attribute, a color attribute and a line attribute, and a pointer A0. The pointer of the drawing information of the starting point Pn is directed to an address A0 which does not exist, and indicates that the drawing at this time is finished.

When an attribute of the drawing is changed at the point Pm, the attribute obtained through the changing is stored in the drawing information for the point Pm. The drawing information of the points (P0, P1, . . . , Pm-1) antecedent to the drawing information for the point Pm has the attribute before being changed, and the drawing information of the points (Pm+1, . . . , Pn) subsequent to the drawing information for the point Pm has the attribute after being changed.

Thus, as a result of storing in the memory the drawing information of tap points between the stylus pen and pad in sequence, and using the addresses specifying the subsequent drawing information stored in the pointers of the respective drawing information, continuous drawing is rendered, and a continuous line with different line attributes is displayed, as shown in FIG. 3, for example.

FIG. 5 shows one exmaple of the above-mentioned thickness attribute made to correspond to respective keys. As shown in FIG. 5, keys of alphabetical letters 'A', 'B', 'C', 'F', 'G' and 'J' of the keyboard are assigned for respective degrees of thickness of a line which are the attribute of drawing.

Specifically, as shown in FIG. 5, for the 'A' key, an attribute of making a line of drawing 'very thin' is set, for the 'B' key, an attribute of a line of drawing 'thin' is set, for the 'C' key, an attribute of making a line of drawing 'medium' is set, for the 'F' key, an attribute of making a line of drawing 'thick' is set, for the 'G' key, an attribute of making a line of drawing 'very thick' is set, and, for the 'J' key (periodic thickness change key), an attribute of changing the thickness of a line periodically is set, previously in the memory.

When any one of the keys 'A', 'B', 'C', 'F', 'G' and 'J' (referred to as 'function keys, hereinafter) is pressed in the middle of inputting of drawing information through the inputting device, the original thickness attribute of the line is changed into the new thickness attribute obtained through the changing operation, and, then, the inputting of the drawing information is continued.

FIG. 6 shows one exmaple of the above-mentioned color attribute made to correspond to keys of the keyboard. As shown in FIG. 6, keys of numerical letters '1', '2', '3', '4', '5' and '6' of the keyboard are assigned for respective colors of a line which are the attribute of drawing.

Specifically, as shown in FIG. 6, for the '1' key, an attribute of making a line of drawing 'green' is set, for the '2' key, an attribute of a line of drawing 'red' is set, for the '3' key, an attribute of making a line of drawing 'blue' is set, for the '4' key, an attribute of making a line of drawing 'black' is set, for the '5' key, an attribute of making a line of drawing 'white' is set, and, for the '6' key (periodic color change key), an attribute of changing the color of a line periodically is set, previously in the memory.

When any one of the keys '1', '2', '3', '4', '5' and '6' (also referred to as 'function keys, hereinafter) is pressed in the middle of inputting of drawing information through the inputting device, the original color attribute of the line is changed into the new color attribute obtained through the changing operation, and, then, the inputting of the drawing information is continued.

FIG. 7 shows one exmaple of the above-mentioned line attribute made to correspond to keys of the keyboard. As shown in FIG. 7, keys of alphabetical letters 'K', 'L', 'O', 'P' and 'Q' of the keyboard are assigned for respective shapes of a line which are the attribute of drawing.

Specifically, as shown in FIG. 7, for the 'K' key, an attribute of making a line of drawing 'solid line' is set, for the 'L' key, an attribute of a line of drawing 'broken line' is set, for the 'O' key, an attribute of making a line of drawing 'chain line' is set, for the 'P' key, an attribute of making a line of drawing 'double line' is set, for the 'Q' key, an attribute of making a line of drawing 'no line' is set, previously in the memory.

When any one of the keys 'K', 'L', 'O', 'P' and 'Q' (also referred to as 'function keys, hereinafter) is pressed in the middle of inputting of drawing information through the inputting device, the original line attribute of the line is changed into the new line attribute obtained through the changing operation, and, then, the inputting of the drawing information is continued.

Figure 8:
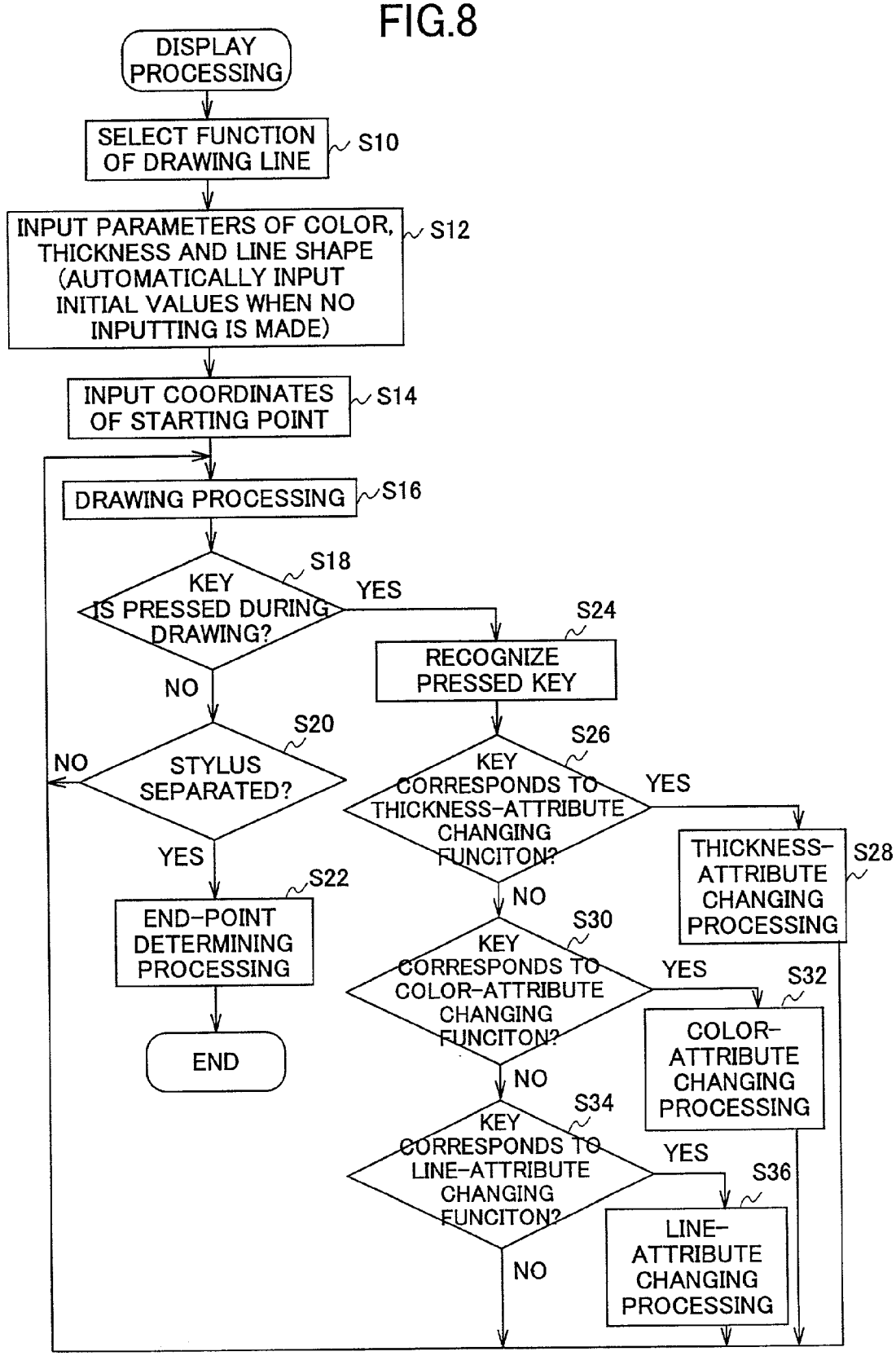
FIG. 8 shows a flow chart of display processing performed by the drawing-information processing apparatus shown in FIGS. 1 and 2.

FIG. 8 is a flow chart of display processing performed by the drawing-information processing apparatus shown in FIGS. 1 and 2. As shown in FIG. 8, in a step S10, a function of drawing a line in response to inputting through the inputting device is selected by an operator. In a step S12, the operator inputs to the apparatus parameters specifying color, thickness and line attributes of the line. When no inputting of any parameters is made by the operator, previously set initial values are automatically set therefor in the step S12. In a step S14, the coordinates of a starting point at which the operator starts inputting through the inputting device is input as drawing information.

In a step of S16, drawing processing is performed based on the drawing information input in the step S14. In a step S18, it is determined whether any key concerning the attribute change is pressed while the drawing information is input. When any key is pressed, the pressed key is recognized in a step S24. After the key is recognized, it is determined in a step S26 whether the recognized key corresponds to the thickness-attribute changing function.

When the key corresponds to the thickness-attribute changing function, the thickness-attribute changing processing is performed in a step S28. When the key does not correspond to the thickness-attribute changing function, it is determined in a step S30 whether the key corresponds to the color-attribute changing function.

When the key corresponds to the color-attribute changing function, the color-attribute changing processing is performed in a step S32. When the key does not correspond to the color-attribute changing function, it is determined in a step S34 whether the key corresponds to the line-attribute changing function.

When the key corresponds to the line-attribute changing function, the line-attribute changing processing is performed in a step S36. When the key does not correspond to the line-attribute changing function, the processing starting from the step S16 is repeated.

When no key is pressed in the step S18 while the drawing is performed, it is determined in a step S20 whether the stylus pen is separated from the pad of the digitizer, and the drawing is finished. When the stylus pen is separated from the pad, the end point thereof is determined in a step S22. When the stylus pen is not separated from the pad in the step S20, the processing starting from the step S16 is repeated.

Thus, by using the previously set keys in the display processing and changing the attributes of drawing in the middle of inputting of drawing, it is possible to perform drawing-information processing efficiently.

Figure 9:
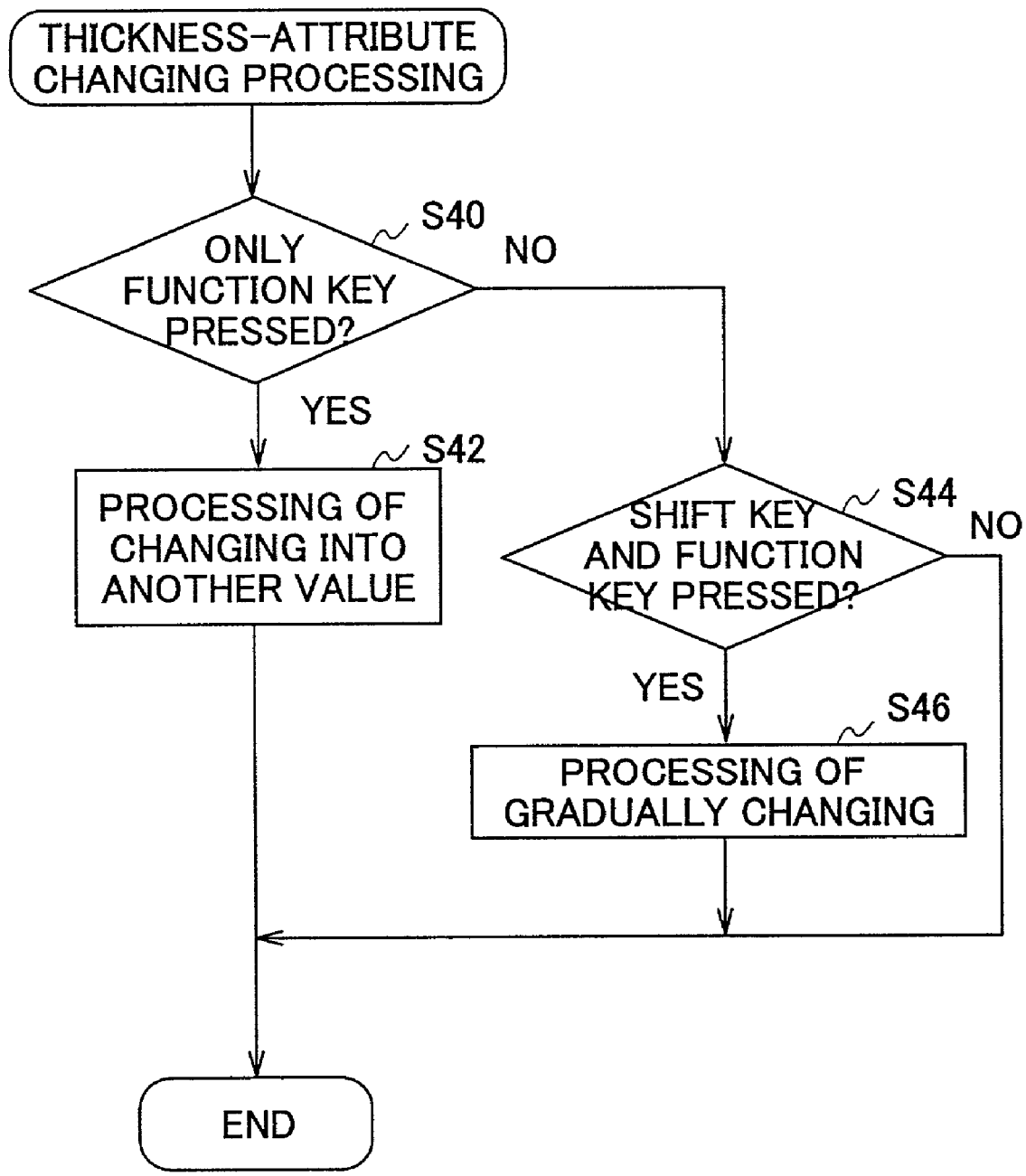
FIG. 9 shows a flow chart of thickness-attribute changing processing shown in FIG. 8.

FIG. 9 is a flow chart of the thickness-attribute changing processing shown in FIG. 8. As shown in FIG. 9, in a step S40, it is determined whether only a key corresponding to the thickness-attribute changing function is pressed. When only a key corresponding to the thickness-attribute changing function is pressed, processing of changing the thickness attribute of the line into the value in attribute of the pressed key is performed in a step S42. When not only a key corresponding to the thickness-attribute changing function is pressed, it is determined in a step S44 whether a Shift key and the function key are pressed simultaneously. When the Shift key and function key are pressed simultaneously, the changing into the value in attribute of this pressed function key is made gradually in a step S46.

Thus, by using the keys of the keyboard to be pressed in a combining manner, it is possible to perform the changing of thickness attribute of drawing in various patterns.

Figure 10:
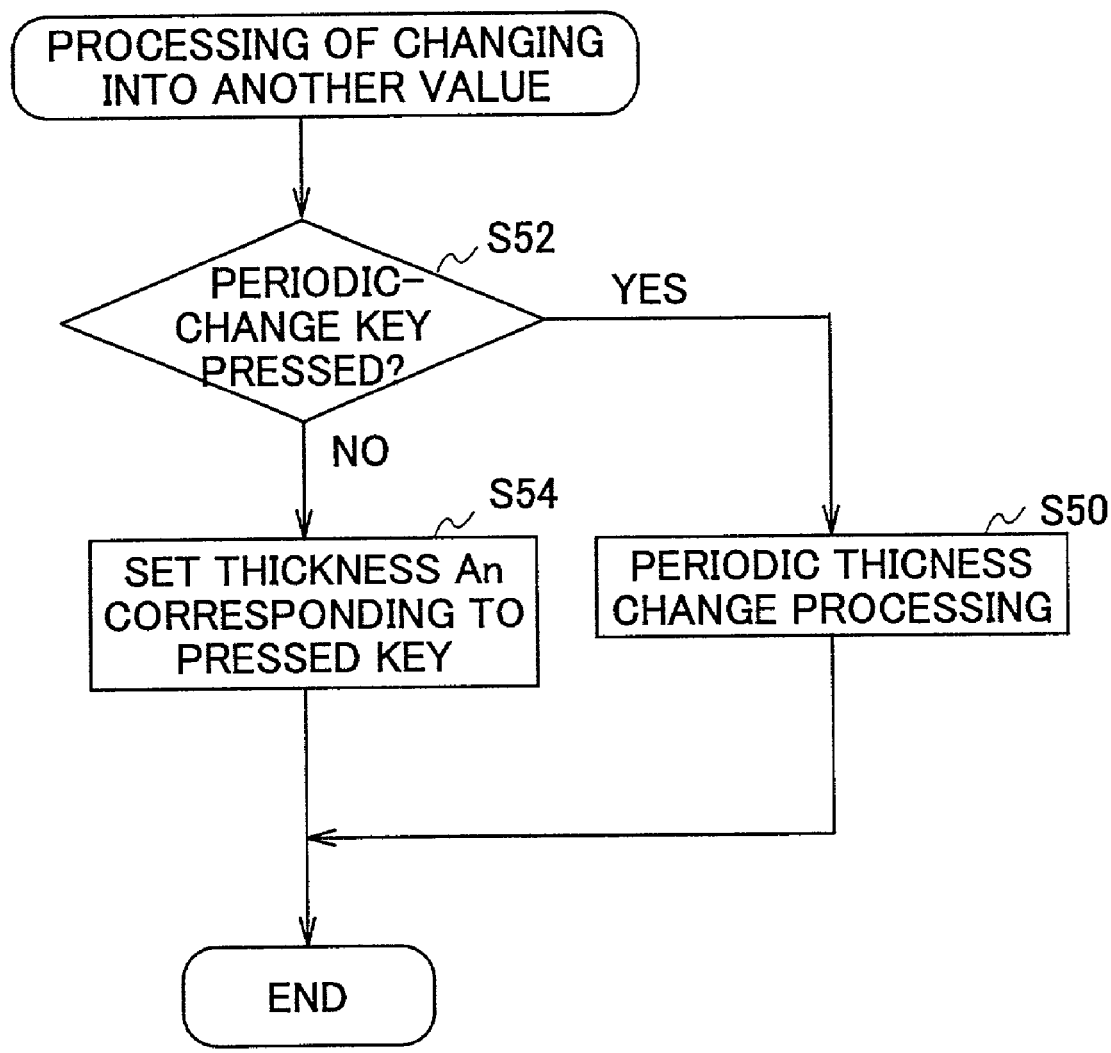
FIG. 10 shows a flow chart of processing of changing into another value shown in FIG. 9.

FIG. 10 is a flow chart of the processing of changing the attribute into another value shown in FIG. 9. As shown in FIG. 10, in a step S52, it is determined whether the pressed key is the above-mentioned periodic thickness change key for specifying the periodic change of thickness attribute. When the pressed key is not this periodic thickness change key, it is determined that the key for specifying thickness attribute is pressed, and the thickness of drawing is set according to the thickness attribute specified by the pressed key, in a step S54. When the pressed key is the periodic thickness change key, the attribute is changed based on data of periodic thickness change previously stored in the memory corresponding to the pressed key, in a step S50.

Thus, it is possible that the thickness attribute of the drawing information is changed into that of the pressed key immediately after the key is pressed, and, also, it is possible that the thickness attribute is changed periodically according to the data of periodic thickness change when the periodic thickness change key is pressed.

Figure 11:
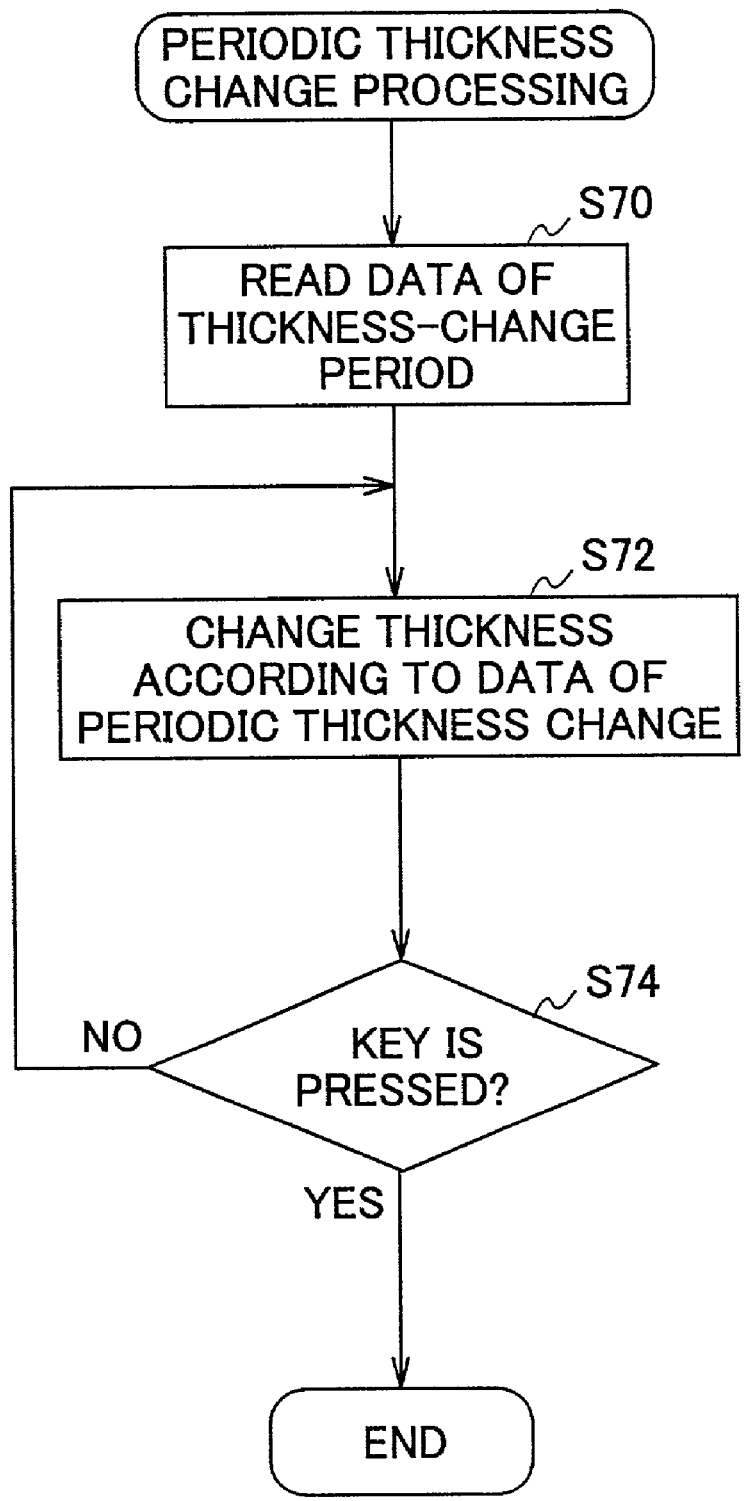
FIG. 11 shows a flow chart of periodic thickness change processing shown in FIG. 9.

FIG. 11 is a flow chart of the periodic thickness change processing shown in FIG. 10. As shown in FIG. 11, in a step S70, the data of periodic thickness change previously stored in the memory corresponding to the pressed key is read. In a step S72, based on the read data of periodic thickness change, the thickness of drawing is changed. In a step S74, it is determined whether the periodic thickness change key is pressed again. When the periodic thickness change key is not pressed again, the processing of the step S72 is repeated. When the periodic thickness change key is again pressed, the periodic thickness change processing is finished.

Thus, it is possible that, when the periodic thickness change key is pressed, the thickness of drawing is changed periodically based on the data of periodic thickness change until this periodic thickness change key is pressed again.

Figure 12:
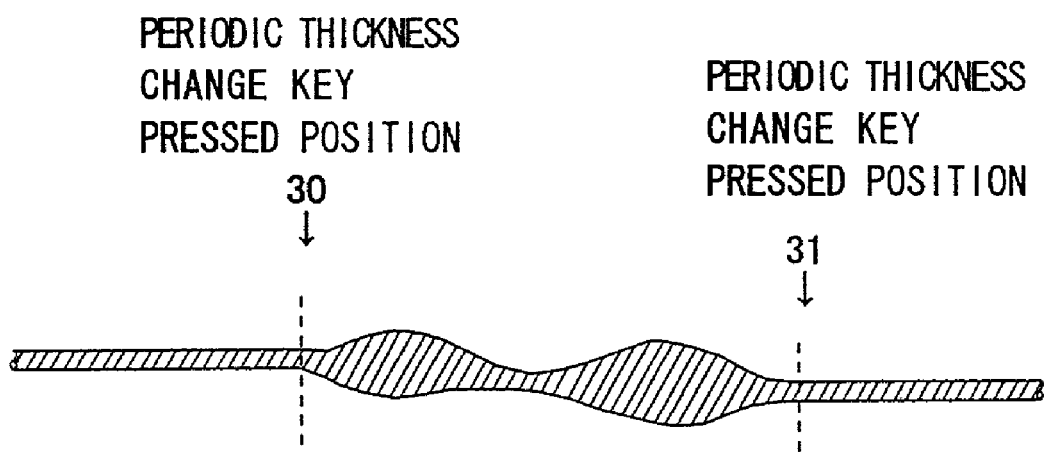
FIG. 12 illustrates the periodic thickness change processing shown in FIG. 11.

FIG. 12 illustrates the periodic thickness change processing shown in FIG. 11.

As shown in FIG. 12, when the periodic thickness change key is pressed, the data of periodic thickness change previously stored in the memory is read. Then, from a position 30 at which the periodic thickness change key is pressed, drawing processing is performed according to the read data of periodic thickness change, as shown in FIG. 12. Specifically, the thickness is increased gradually, and, then, after the thickness reaches a predetermined thickness, the thickness is decreased gradually. This periodic thickness change continues until the periodic thickness change key is pressed again. When the periodic thickness change key is pressed again at a position 31 shown in FIG. 12, the thickness attribute at the position 31 is set for the subsequent drawing.

Figure 13:
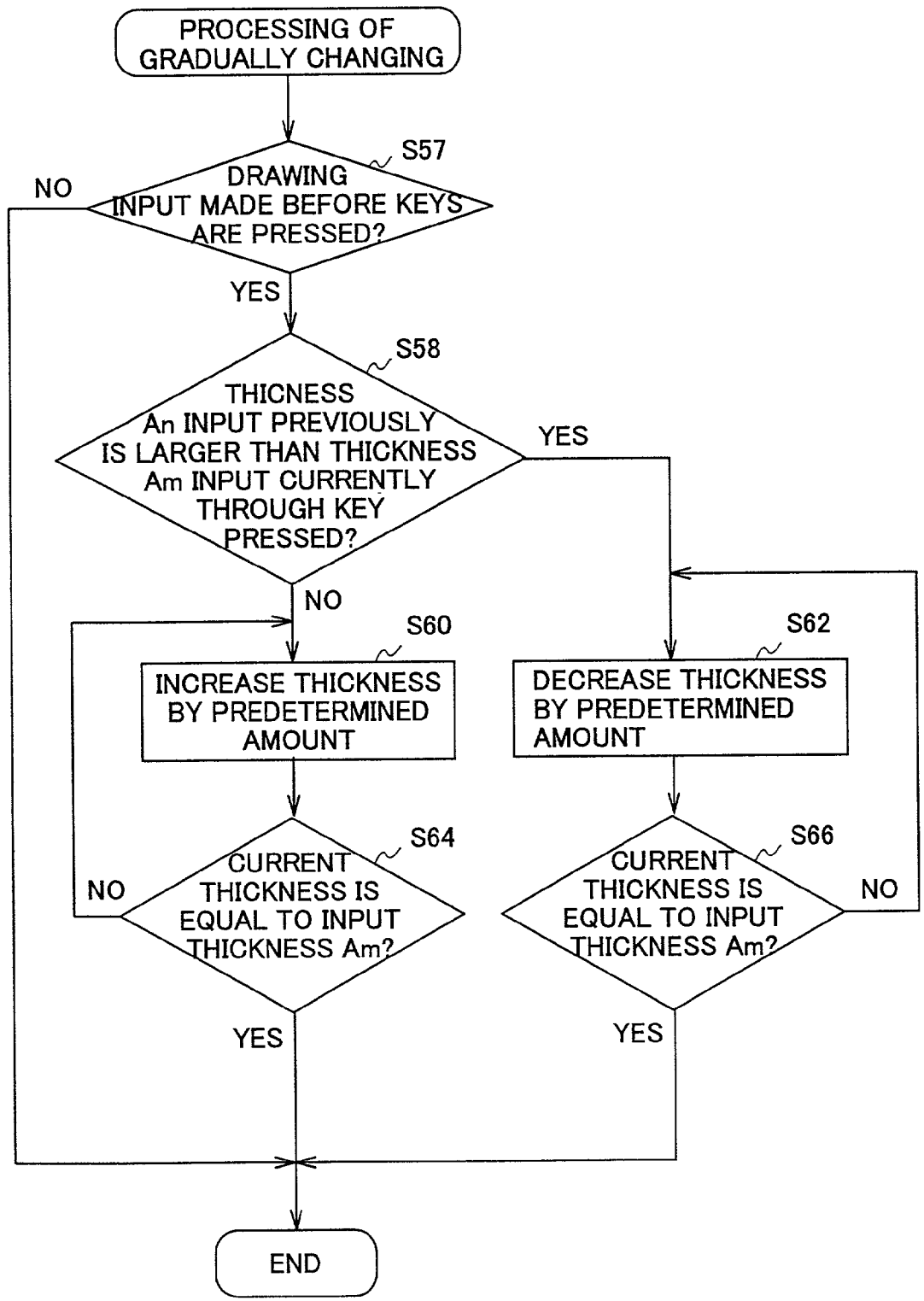
FIG. 13 shows a flow chart of processing of gradually changing shown in FIG. 9.

FIG. 13 shows a flow chart of processing of gradually changing shown in FIG. 9. As shown in FIG. 13, in a step S57, it is determined whether input for drawing is made before the input for attribute change made through key pressing. When input for drawing is made before the input for attribute change, it is determined in a step S58 whether the thickness An previously set is larger than the thickness Am currently input through key pressing.

When the previously set thickness An is smaller than the currently input thickness Am, that is, the thickness attribute is changed into a thicker one, and a step 60 is performed. In the step S60, the thickness is gradually increased at a predetermined rate toward the thickness Am corresponding to the pressed function key. After the thickness of drawing is changed in the step S60, it is determined in a step S64 whether the thus-obtained current thickness is equal to the input thickness Am. When the current thickness is equal to the thickness Am, the current processing of gradually changing is finished. When the current thickness is not equal to the thickness Am, the processing starting from the step S60 is again performed.

When the thickness An previously set is larger than the thickness Am currently set through key pressing in the step S58, that is, the thickness attribute is changed into a thinner one, and a step S62 is performed. In the step S62, the thickness is gradually decreased at a predetermined rate toward the thickness Am corresponding to the pressed function key. After the thickness of drawing is changed in the step S62, it is determined in a step S66 whether the thus-obtained current thickness is equal to the input thickness Am. When the current thickness is equal to the thickness Am, the current processing of gradually changing is finished. When the current thickness is not equal to the thickness Am, the processing starting from the step S62 is again performed.

Thus, when the previously set thickness of drawing is a value larger than a value of the thickness corresponding to the pressed function key, the thickness of drawing input is changed so as to be gradually decreased. When the previously set thickness of drawing is a value smaller than a value of the thickness corresponding to the pressed function key, the thickness of drawing input is changed so as to be gradually increased.

Figure 14:
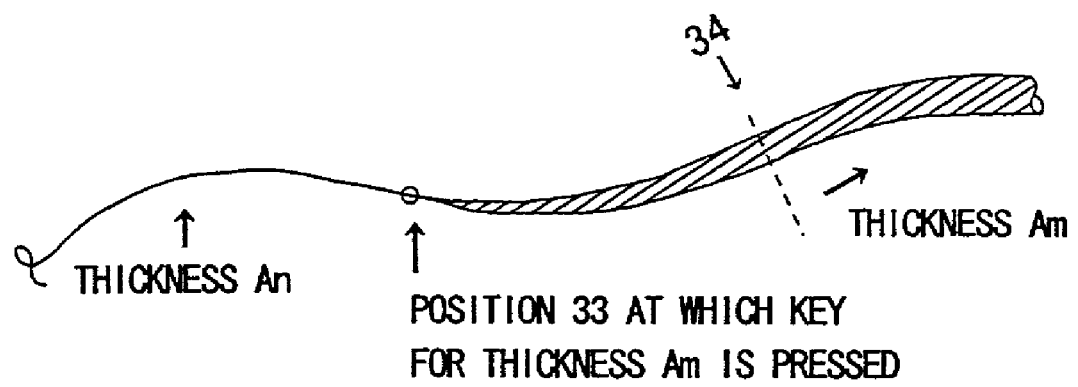
FIG. 14 illustrates the processing of gradually changing shown in FIG. 13.

FIG. 14 illustrates the processing of gradually changing shown in FIG. 13.

As shown in FIG. 14, when the key to which the attribute of thickness Am is assigned is pressed, the thickness of drawing is gradually changed so that the thickness changes from the thickness An into the thickness Am, from a position 33 at which the key is pressed. When the thickness becomes the thickness Am at a drawn position 34, the thickness attribute is set as the thickness Am for the subsequent drawing, and, then, the drawing processing is continued.

Figure 15:
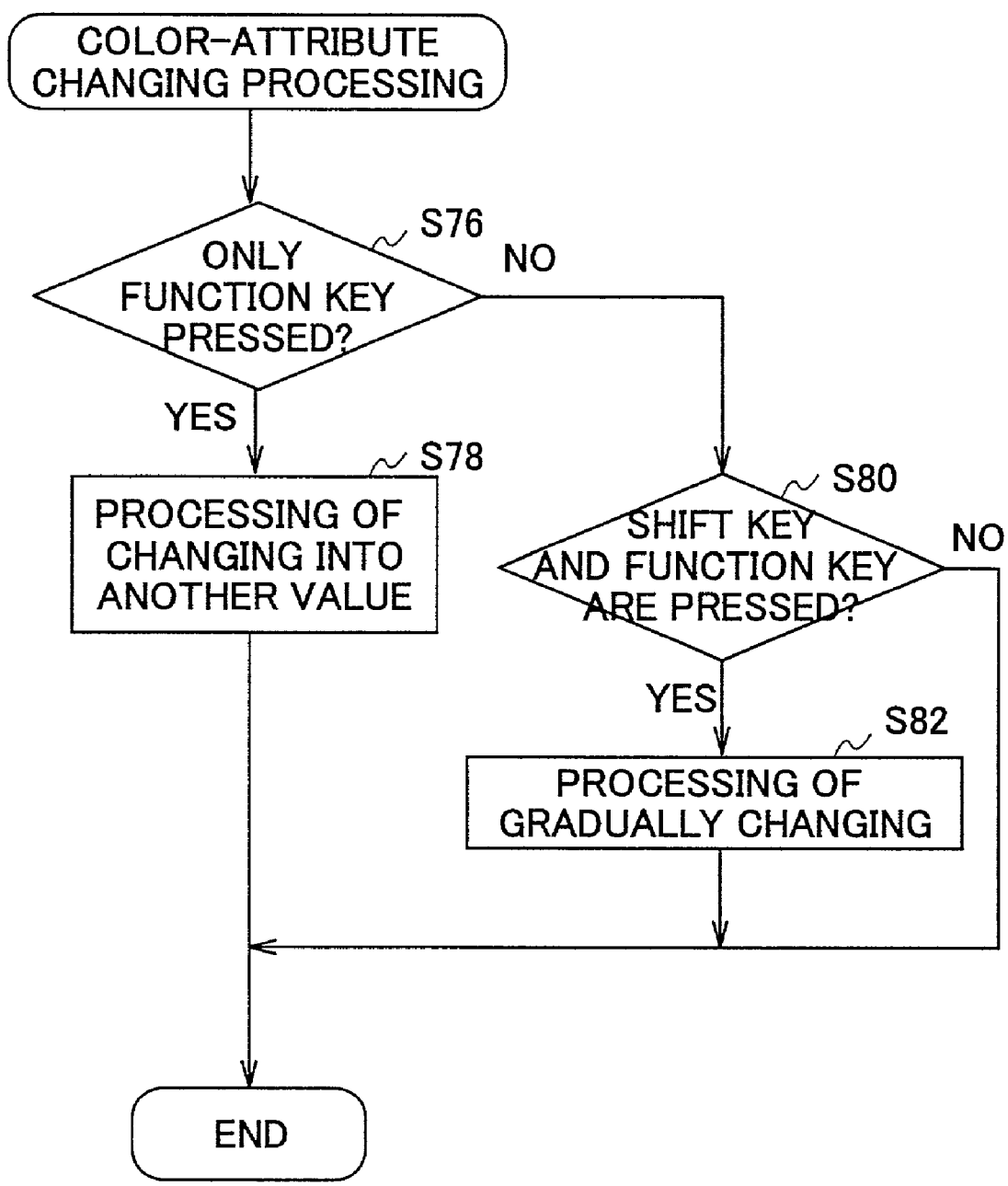
FIG. 15 shows a flow chart of color-attribute changing processing shown in FIG. 8.

FIG. 15 shows a flow chart of the color-attribute changing processing shown in FIG. 8. As shown in FIG. 15, in a step S76, it is determined whether only a key corresponding to the color-attribute changing function is pressed. When only a key corresponding to the color-attribute changing function is pressed, processing of changing the attribute into a value in attribute of the pressed key is performed in the step S78. When not only a key corresponding to the color-attribute changing function is pressed, it is determined in a step S80 whether the Shift key and the function key are pressed together. When the Shift key and the function key are pressed, processing of gradually changing the attribute into the value in attribute of the pressed key is performed in a step S80.

Thus, by using the keys of the keyboard in a combining manner, it is possible to perform the change of color attribute in various patterns.

Figure 16:
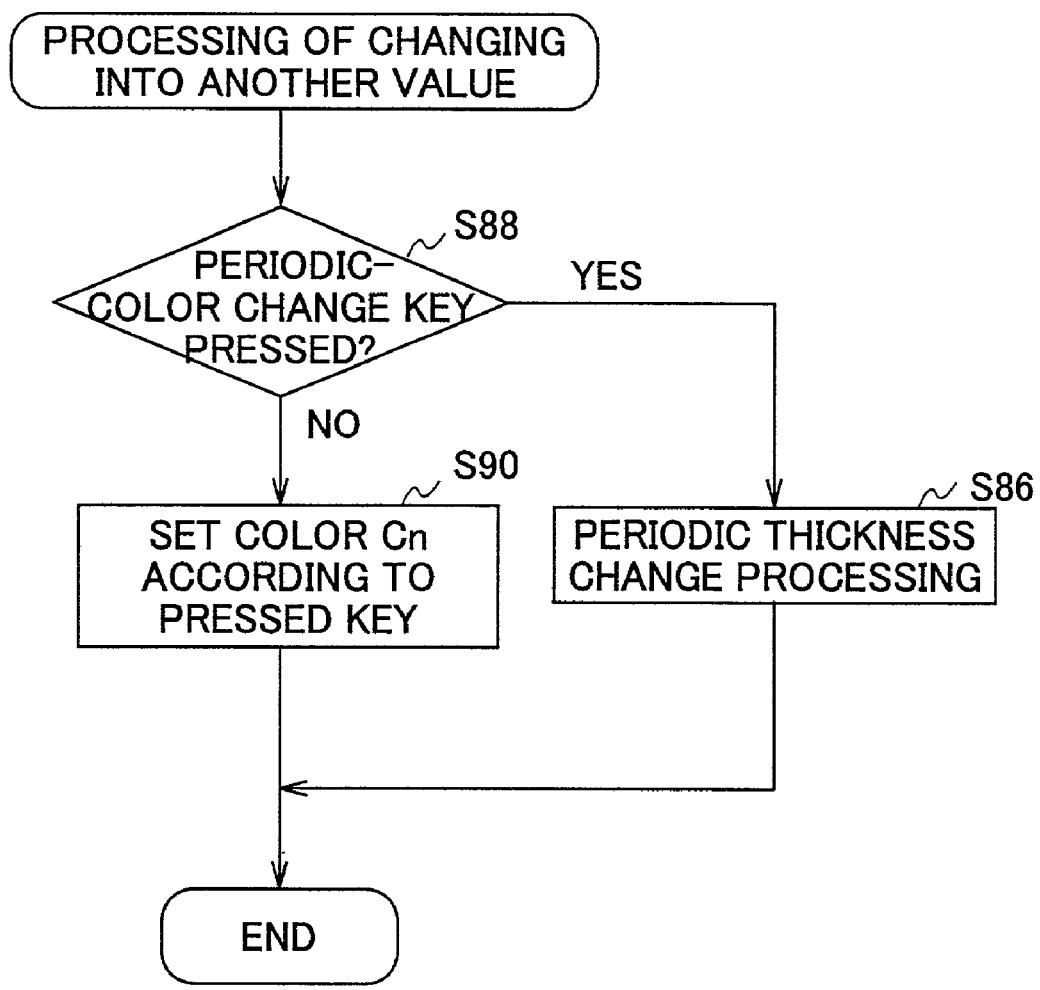
FIG. 16 shows a flow chart of changing into another value shown in FIG. 15.

FIG. 16 shows a flow chart of the processing of changing into another value shown in FIG. 15. As shown in FIG. 16, in a step S88, it is determined whether the pressed key is the periodic color change key. When the pressed key is not the periodic color change key, it is determined that the key to which the color attribute is set is pressed, and, in a step S90, the color Cn of drawing, which is the color of drawing before the key is pressed, is changed into the color according to the pressed key. When the pressed key is the periodic color change key, the periodic color change processing is performed in a step S86.

Thus, it is possible that, when the key to which the color attribute is set is pressed, the color of drawing is changed into the color corresponding to the pressed key immediately. Further, it is possible that, when the periodic color change key is pressed, the color of drawing is changed according to periodic color change data.

Figure 17:
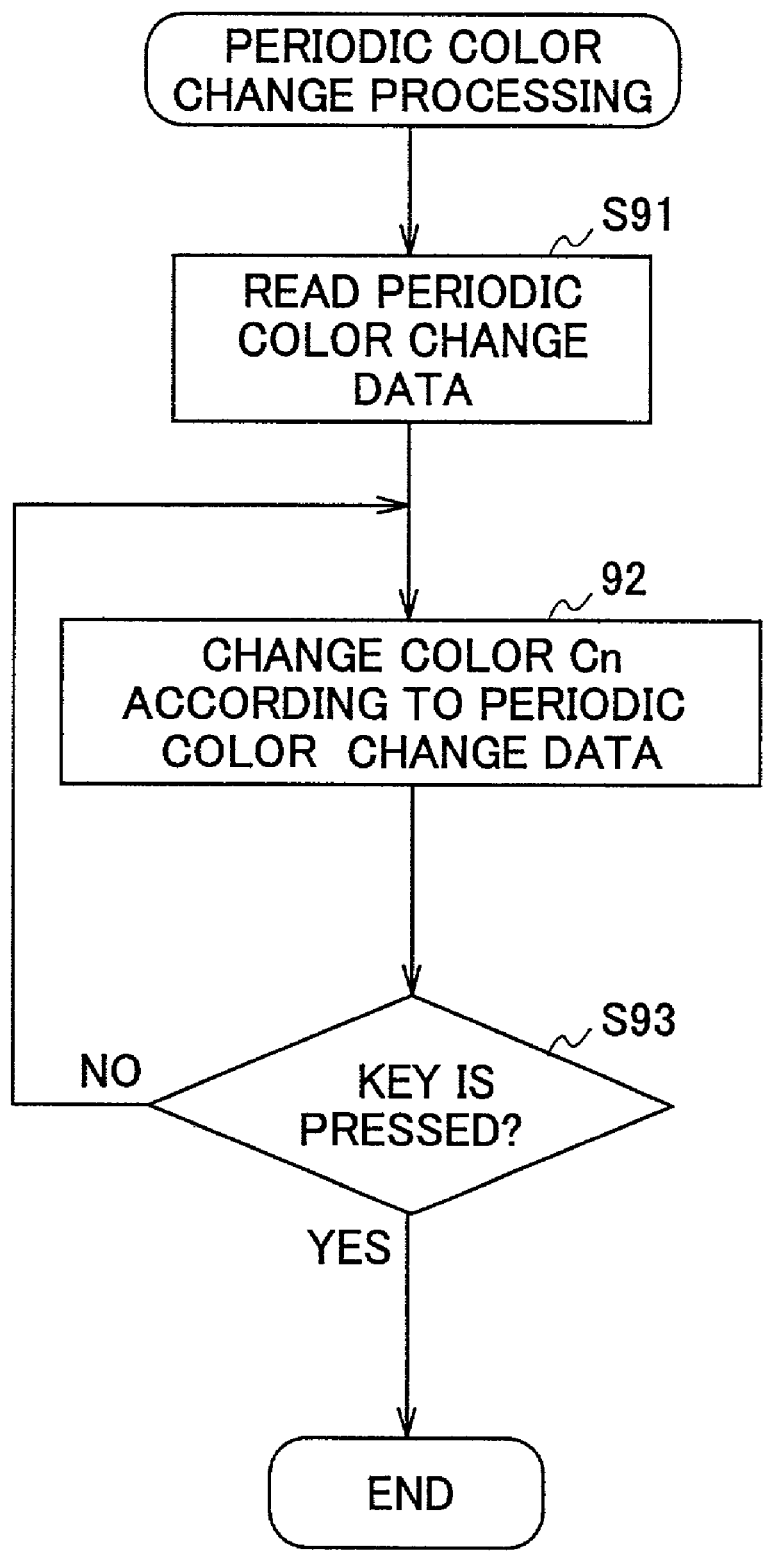
FIG. 17 shows a flow chart of periodic color change processing shown in FIG. 16.

FIG. 17 shows a flow chart of the periodic color change processing shown in FIG. 16. As shown in FIG. 17, in a step S91, the periodic color change data previously stored so as to correspond to the pressed key is read from the memory. In a step S92, the color Cn of drawing, which is the color of drawing before the periodic color change key is pressed, is changed in sequence of colors according to the read periodic color change data. In a step S93, it is determined whether the periodic color change key is again pressed. When the periodic color change key is not again pressed, the processing of the step S92 is repeated, and the color attribute is changed periodically. When the periodic color change key is pressed again, the periodic color change processing is finished. A specific example of the periodic color change processing will be described later with reference to FIG. 19.

Thus, it is possible that, when the key to which the periodic color change is set is pressed, the periodic color change data is read, and, the color of drawing is changed based on the read periodic color change data.

Figure 18:
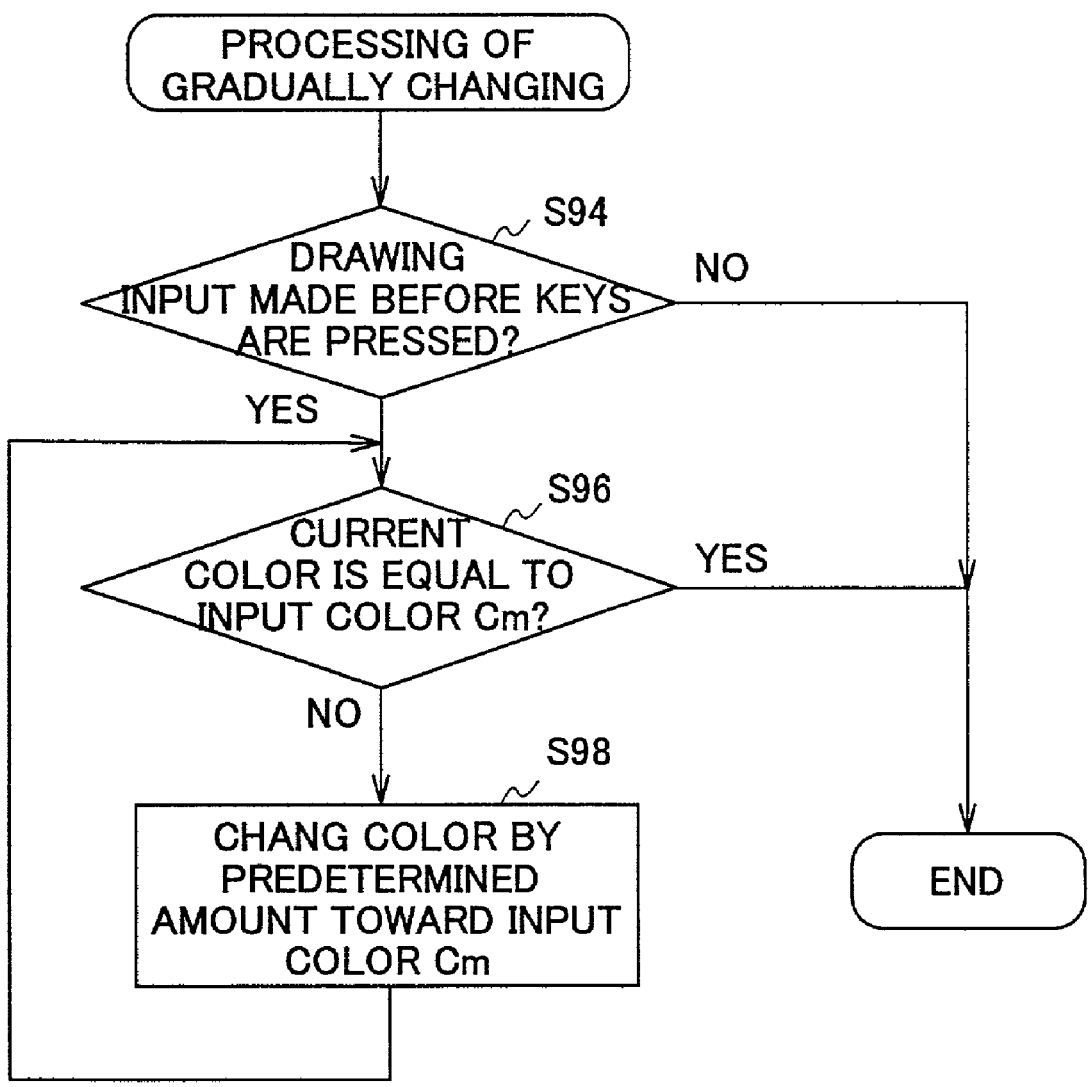
FIG. 18 shows a flow chart of processing of gradually changing shown in FIG. 15.

FIG. 18 shows a flow chart of the processing of gradually changing shown in FIG. 15. As shown in FIG. 18, in a step S94, it is determined whether input for drawing is made before the keys are pressed. When input for drawing is made before the keys are pressed, it is determined in a step S96 whether the current color is the same as the color Cm input through the above-mentioned key pressing. When the current color is not the same as the input color Cm, the color of drawing is changed at a predetermined rate so that the color of drawing is changed toward the color Cm in a step S98. After the color of drawing is changed in the step S98, the processing of the step S96 is again performed. When the current color is equal to the input color Cm in the step S96, the processing of gradually changing of color attribute is finished.

Thus, it is possible that, when the Shift key and color-attribute key are pressed in a combining manner, the color of drawing before the keys are pressed is changed gradually at a predetermined color rate toward the color corresponding to the pressed color-attribute key.

Figure 19:
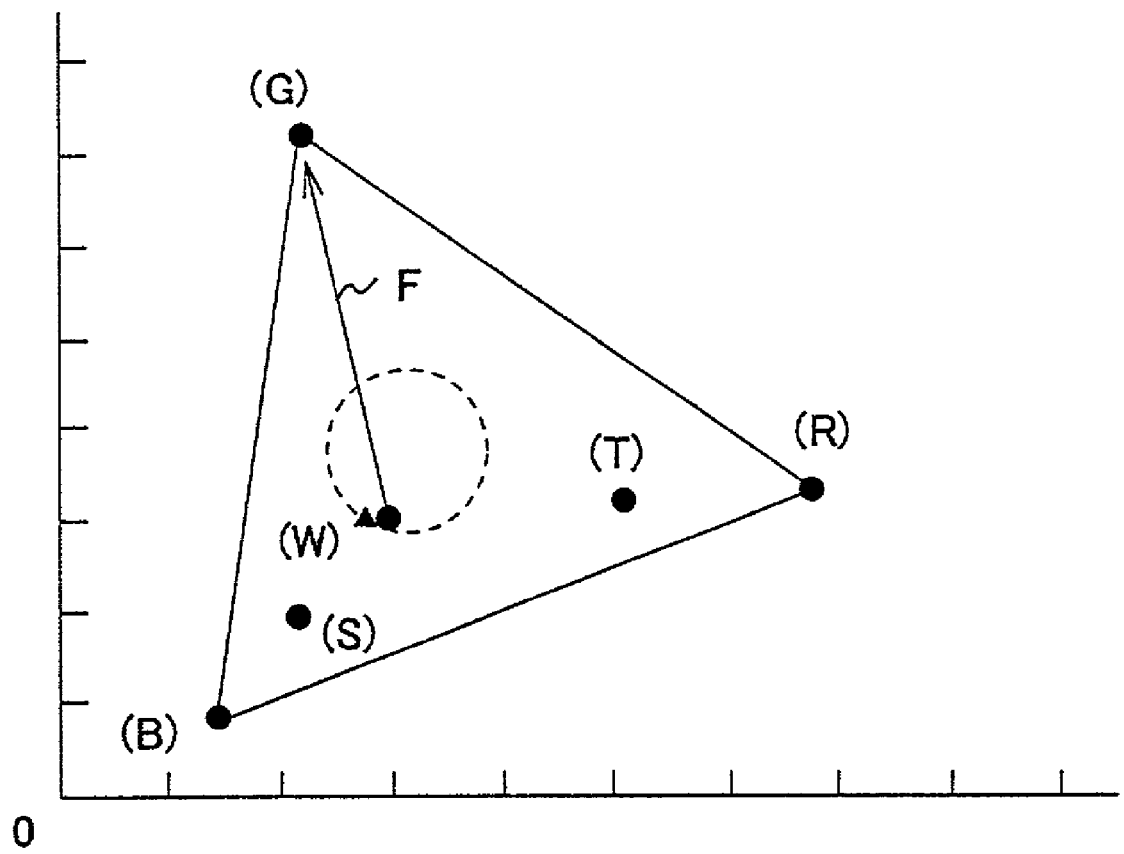
FIG. 19 illustrates the processing of changing of color attribute shown in FIGS. 16, 17 and 18.

FIG. 19 illustrates the color-attribute changing processing described with reference to FIGS. 16, 17 and 18. In FIG. 19, a range of color of drawing displayed on the display unit is shown. The range of color of drawing includes green (G), blue (B) and red (R). The range enclosed by the straight line connecting G and R, straight line connecting B and G and straight line connecting R and B is the displayable range of color of drawing. When the three colors R, G and B are mixed in this range, white (W) is generated.

In the processing of changing the attribute of drawing into another value in color attribute, when the color of drawing before change of color attribute is blue (B), and the key for the red (R) in attribute is pressed, the color of drawing is changed from blue into red.

In the periodic color change processing shown in FIG. 17, when the periodic color change key is pressed, for example, periodic color change data is read from the memory in the cycle of red (R), pink (T), white (W), light blue (S) and blue (B), for example. In this example, when the color of drawing before the color attribute is changed is blue (B), the color of drawing is changed from blue (B)→red (R)→pink (T)→white (W)→light blue (S)→blue (B)→ . . . Further, the periodic color change processing shown in FIG. 17 may be such that periodic color change is set such that the color of drawing is changed continuously along the broken line shown in FIG. 19 in the range of color of drawing.

In the processing of gradually changing shown in FIG. 18, when the color of drawing before change of color attribute is white (W), and the key for the green (G) in attribute as well as the Shift key are pressed, the color of drawing is changed gradually along the arrow F in the range of color of drawing shown in FIG. 19. Accordingly, the color of drawing is changed from white into green gradually.

Figure 20:
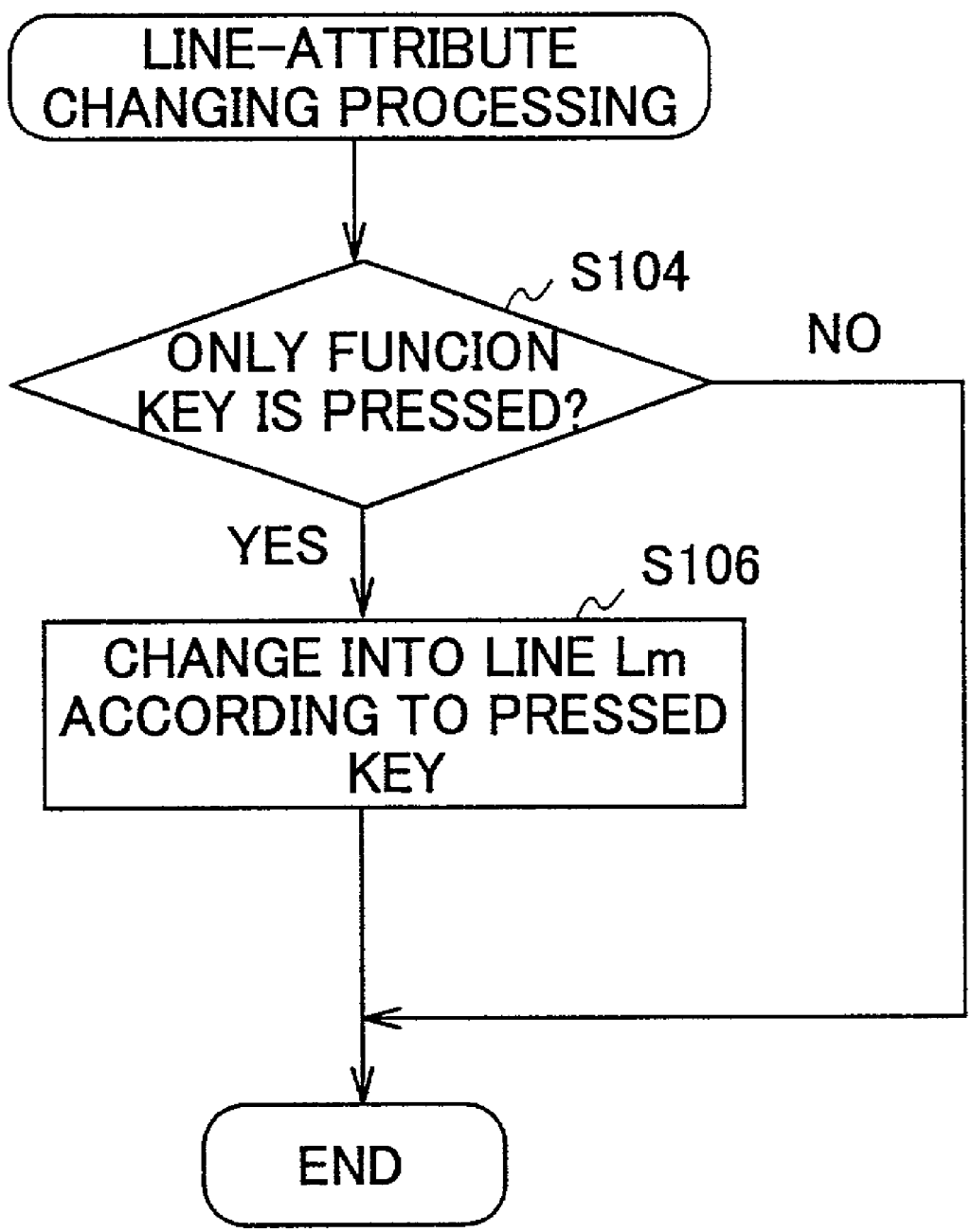
FIG. 20 shows a flow chart of line-attribute changing processing shown in FIG. 8.

FIG. 20 shows a flow chart of the line-attribute changing processing shown in FIG. 8. As shown in FIG. 20, in a step S104, it is determined whether only a key corresponding to the line-attribute changing function is pressed. When only a key corresponding to the line-attribute changing function is pressed, the line attribute of drawing is changed into the line (form) Lm corresponding to the pressed key. For exmaple, when the line (form) attribute of a line of drawing before the key is pressed is a solid line shown in FIG. 7, and the line (form) attribute corresponding to the pressed key is a broken line, the solid line is changed into a broken line, and, then, the drawing processing is continued.

The present invention is not limited to the above-described embodiment, and variations and modifications may be made without departing from the scope of the present invention.

The present application is based on Japanese priority applications No. 2000-246006, filed on Aug. 14, 2000, the entire contents of which are hereby incorporated by reference.

What is claimed is:

1. A drawing-information processing apparatus setting drawing information at positions specified through a drawing-information inputting part, comprising:
   an attribute-inputting part setting an attribute of the drawing information; and
   a changing part gradually changing the attribute of the drawing information while the drawing information is input through said drawing-information inputting part by initiating a predetermined sequence of gradual changes in a line drawing attribute, in response to a single action of an operator operating a predetermined control key of the attribute-inputting part;
   wherein the attribute changed by said changing part comprises a line thickness attribute or a line shape attribute.

2. The apparatus as claimed in claim 1, wherein said changing part comprises at least one of:
   a thickness-attribute changing part changing a thickness attribute of the drawing information; and
   a line-attribute changing part changing a line shape attribute of the drawing information.

3. A drawing-information processing apparatus setting drawing information at positions specified through a drawing-information inputting part, comprising:

an attribute-inputting part setting an attribute of the drawing information; and a changing part periodically changing the attribute of the drawing information while the drawing information is input through said drawing-information inputting part by initiating a predetermined sequence of periodical changes in a line drawing attribute, in response to a single action of an operator operating a predetermined control key of the attribute-inputting part;

wherein the attribute changed by said changing part comprises a line thickness attribute or a line shape attribute.

4. The apparatus as claimed in claim 3, wherein said changing part comprises at least one of:

a thickness-attribute changing part changing a thickness attribute of the drawing information; and a line-attribute changing part changing a line shape attribute of the drawing information.

5. A drawing-information processing method setting drawing information at positions specified through a drawing-information inputting device, comprising:

setting an attribute of the drawing information; and gradually changing the attribute of the drawing information while the drawing information is input through said drawing-information inputting device by initiating a predetermined sequence of gradual changes in a line drawing attribute, in response to a single action of an operator operating a predetermined control key of the attribute inputting part;

wherein the attribute to be gradually changed comprises a line thickness attribute or a line shape attribute.

6. The method as claimed in claim 5, wherein said gradually changing comprises at least one of:

changing a thickness attribute of the drawing information; and changing a line shape attribute of the drawing information.

7. A drawing-information processing method setting drawing information at positions specified through a drawing-information inputting device, comprising:

setting an attribute of the drawing information; and periodically changing the attribute of the drawing information while the drawing information is input through said drawing-information inputting device by initiating a predetermined sequence of periodical changes in a line drawing attribute, in response to a single action of an operator operating a predetermined control key of the attribute-inputting part;

wherein the attribute to a periodically changed comprises a line thickness attribute or a line shape attribute.

8. The method as claimed in claim 7, wherein said periodically changing comprises at least one of:

changing a thickness attribute of the drawing information; and changing a line shape attribute of the drawing information.

9. A computer-readable recording medium having recorded therein a program for causing a computer to set drawing information at positions specified through a drawing-information inputting device, the program comprising:

first program code means for setting an attribute of the drawing information;

second program code means for changing the attribute of the drawing information while the drawing information is input through said drawing-information inputting device, wherein said second program code means further comprises a third program code means for changing the attribute of the drawing information gradually by initiating predetermined sequence of gradual changes in a line drawing attribute, in response to a single action of an operator operating a predetermined control key of the attribute-inputting part;

wherein the attribute to be gradually changed comprises a line thickness attribute or a line shape attribute.

10. The recording medium as claimed in claim 9, wherein said second program code means comprises at least one of:

fourth program code means for changing a thickness attribute of the drawing information; and fifth program code means for changing a line shape attribute of the drawing information.

11. A computer-readable recording medium having recorded therein a program for causing a computer to set drawing information at positions specified through a drawing-information inputting device, the program comprising:

first program code means for setting an attribute of the drawing information;

second program code means for changing the attribute of the drawing information while the drawing information is input through said drawing-information inputting device, wherein said second program code means comprises a third program code means for changing the attribute of the drawing information periodically by initiating a predetermined sequence of periodical changes in a line drawing attribute, in response to a single action of an operator operating a predetermined control key of the attribute-inputting part;

wherein the attribute to be periodically changed comprises of a line thickness attribute or a line shape attribute.

12. The recording medium as claimed in claim 11, wherein said second program code means comprises at least one of:

fourth program code means for changing a thickness attribute of the drawing information; and fifth program code means for changing a line shape attribute of the drawing information.

13. A computer-readable storage storing a program for causing a computer to set drawing information at positions specified through a drawing-information inputting device, by:

setting an attribute of the drawing information; and in response to a single action of an operator operating a predetermined control key of the drawing-information inputting device, initiating a predetermined sequence of gradual changes in the drawing information attribute while the drawing information is input through said drawing-information inputting device;

wherein the attribute to be gradually changed comprises a line thickness attribute or a line shape attribute.

14. The computer-readable storage as claimed in claim 13, wherein said gradually changing the attribute comprises at least one of:

changing a thickness attribute of the drawing information; and changing a line shape attribute of the drawing information.

15. A computer-readable storage storing a program for causing a computer to set drawing information at positions specified through a drawing-information inputting device, by:

setting an attribute of the drawing information; and in response to a single action of an operator operating a predetermined control key of the drawing-information inputting device, initiating a predetermined sequence of periodical changes in the drawing information attribute while the drawing information is input through said drawing-information inputting device;

wherein the attribute to be periodically changed comprises a line thickness attribute and or a line shape attribute.

16. The computer-readable storage as claimed in claim 15, wherein said periodically changing the attribute comprises at least one of:

changing a thickness attribute of the drawing information; and changing a line shape attribute of the drawing information.

* * * * *

UNITED STATES PATENT AND TRADEMARK OFFICE
CERTIFICATE OF CORRECTION

| | | |
|---|---|---|
| PATENT NO. | : 7,170,523 B2 | |
| APPLICATION NO. | : 09/790696 | |
| DATED | : January 30, 2007 | |
| INVENTOR(S) | : Naoki Suzuki | |

It is certified that error appears in the above-identified patent and that said Letters Patent is hereby corrected as shown below:

Title Page;
1. Cover Page of the Patent, Column 1 (Title, No. (54)), Line 3, change "PROCESSED" to --PROCESSING--.

2. First Page of the specification, before the Title "BACKGROUND OF THE INVENTION", Column 1 (Title), Line 3, change "PROCESSED" to --PROCESSING--.

3. Column 13, Line 9, after "attribute" delete "and".

Signed and Sealed this

Fifteenth Day of May, 2007

JON W. DUDAS
*Director of the United States Patent and Trademark Office*